United States Patent [19]
Celesta

[11] 3,827,462
[45] Aug. 6, 1974

[54] INSULATING PLUG
[76] Inventor: Jerry J. Celesta, Rodeo, Calif.
[22] Filed: Aug. 7, 1972
[21] Appl. No.: 278,512

[52] U.S. Cl. ............................... 138/90, 220/55 K
[51] Int. Cl. ............................................ F16l 55/10
[58] Field of Search......... 138/90, 92, 89; 220/42 B, 220/42 D, 25, 55 K, 55 Y, 55 BD; 215/33, 35, 36, 82, 83, 89, 71, 72, 64, 90, 86, 52, 53, 85, 87, 88, 96; 229/46

[56] References Cited
UNITED STATES PATENTS

| 632,567 | 9/1899 | Hayne | 215/89 |
| 2,449,290 | 9/1948 | Gavriles | 215/52 |
| 3,307,590 | 3/1967 | Carlson | 138/149 |
| 3,658,096 | 4/1972 | Higuera | 220/55 K X |

Primary Examiner—William I. Price
Assistant Examiner—Steven M. Pollard
Attorney, Agent, or Firm—Townsend and Townsend

[57] ABSTRACT

A plug for closing and insulating holes through thermal insulation around pipe, vessels and the like. A plug extends into the hole and has a cap covering the hole and limiting the maximum extent to which the plug can enter the hole. A groove extends across the cap and holds an elongate spring having oppositely oriented arms that protrude past the groove, into the insulation around the pipe and beneath an outermost insulation layer or skin. The groove is sufficiently deep so that the spring continuously biases the cover into engagement with the skin to thereby removably retain the plug in the hole.

21 Claims, 4 Drawing Figures

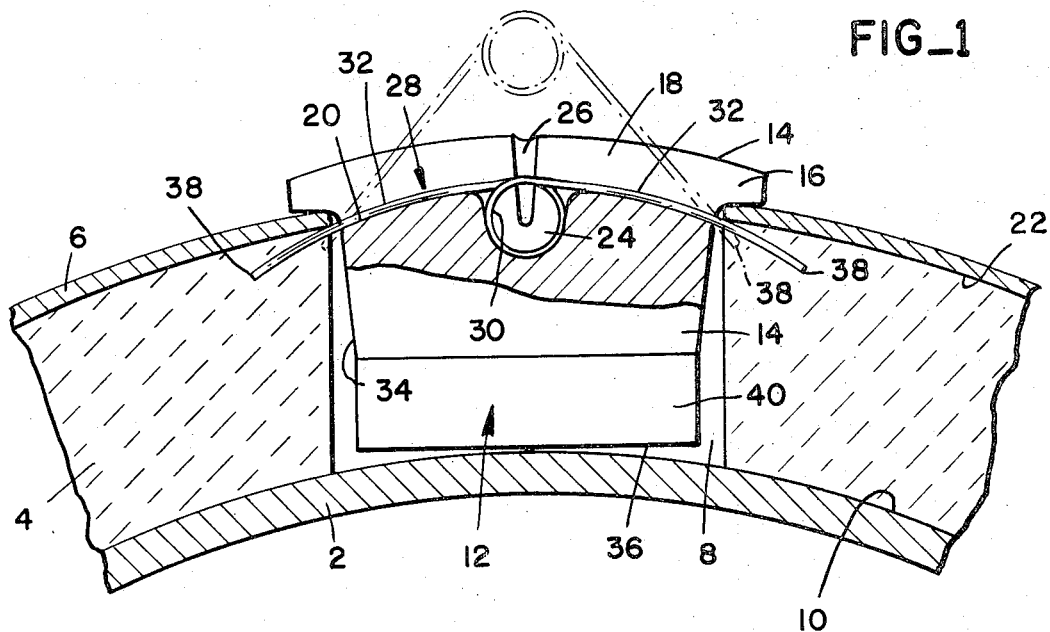
FIG_1
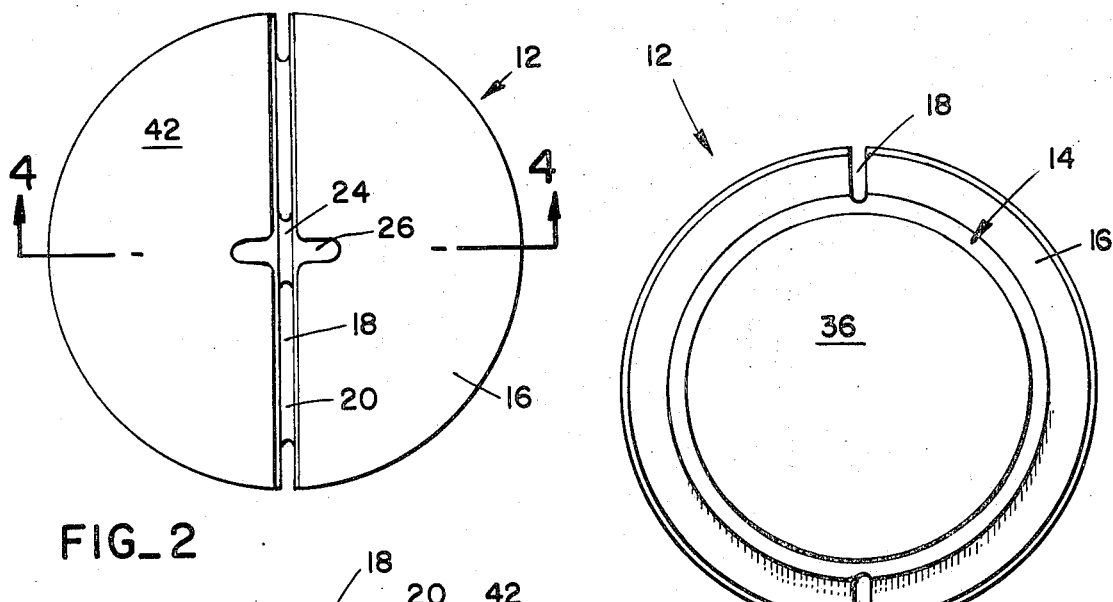
FIG_2
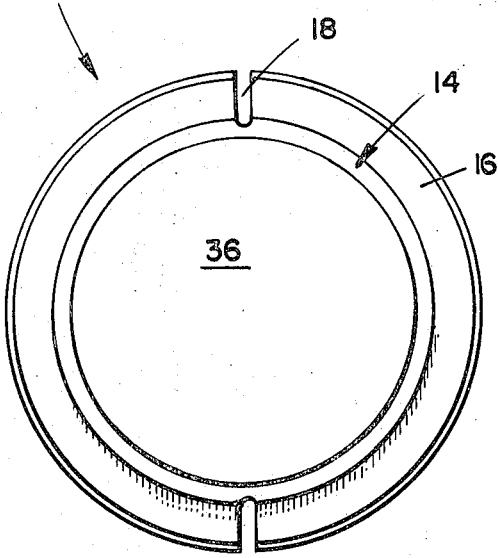
FIG_3
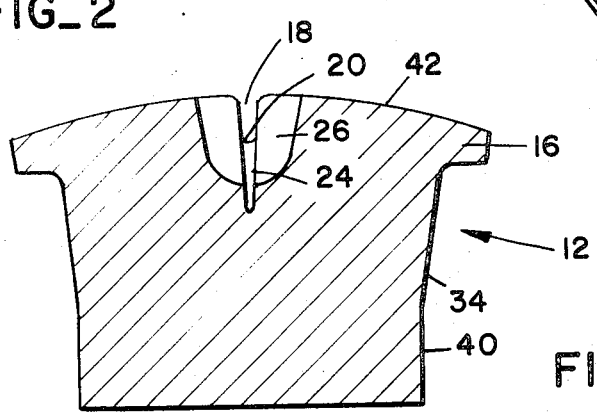
FIG_4

INSULATING PLUG

BACKGROUND OF THE INVENTION

In cryogenic or in high temperature systems as employed in refineries and chemical processing plants, for example, pipe, tanks and other vessels carrying frequently corrosive or caustic fluids or gases of very low or very high temperatures are heavily insulated. Various types and configurations of insulating material are employed; e.g., preformed length of insulation defining half cylinders clamped together about the pipes, premolded insulation formed directly on the pipes or strips of insulation wrapped around the pipes. To prevent pipe failure in such systems it is necessary to periodically check erosive effects of the fluids on the interior of the pipe.

Presently, the most satisfactory inspection employs ultrasonic test devices which nondestructively detect the thickness of the pipe, the lack or presence of solids buildup on the interior of the pipe, etc. Ultrasonic transducers employed by such devices must be directly placed against the pipe wall; intermediate insulation layers cannot be tolerated.

After a test has been made, it is highly desirable if not mandatory to re-insulate the holes in the insulation around the pipe. It is difficult, time-consuming and expensive to apply new insulation in the hole only or over the pipe in the vicinity of the hole. This is further highly undesirable and impractical since the nondestructive ultrasonic testing of the pipes is periodically repeated over the life of the pipe.

Consequently, it has been proposed to provide removable insulating plugs which can be placed into the holes or bores and which are readily removable for the ultrasonic inspection of such pipe. U.S. Pat. No. 3,658,096, issued Apr. 25, 1972 for INSULATING PLUG discloses a substantial improvement over earlier removable insulation or closing techniques and devices. In that patent it is proposed to provide a flat metallic cover plate which has two diametrically opposite slots. An insulating member is bolted to the underside of the plate. An elongate, resilient handle terminates in pointed ends and extends through the slots. The plug is installed by initially lifting the handle to retract the pointed ends, placing the bolted-on insulation into the bore until the cover plate rests on the insulation surrounding the bore, and thereafter pressing the handle towards the metallic plate to push the pointed ends into the insulating material. The pointed ends engage the insulation material and retain the plug in place.

Although the plug disclosed in that patent has been a substantial improvement, in practice it has been less than fully satisfactory. The bores in the insulation layers are typically rough, noncircular and vary in diameter by as much as one-quarter inch or more from the nominal diameter. This can make it difficult to properly extend the pointed handle ends into the insulation.

Furthermore, at all times the handle protrudes well beyond the flat cover. That was thought to be desirable to facilitate the ease with which the plugs are removed and replaced. In practice, it has proved to attract the curiosity of bystanders which, unfamiliar with the manner in which such plugs are removed and inserted, frequently seek to remove the plug and permanently damage the plug and/or the bore in the insulation. Furthermore, the plug design disclosed in that patent is relatively complicated and involves a substantial number of relatively expensive parts that must be separately assembled. The plug is therefore expensive. Overall, therefore, the prior art plug disclosed in that patent has not fully measured up to its expectations.

SUMMARY OF THE INVENTION

The present invention provides a lowcost, one-piece tamper proof insulating plug for closing and insulating testing holes or bores in high or low temperature insulations around pipes, tanks and other vessels. Short of destructing the plug it is virtually impossible for unauthorized persons, particularly those unfamiliar with the construction and operation of the plug, to remove it from the hole in the insulation. Furthermore, it is practically impossible to accidentally dislodge the insulating plug of the present invention unless it is forcefully struck and fragmentized; simply brushing against it will not dislodge it, as was frequently the case with prior art plugs.

In its broadest form a plug constructed in accordance with the invention comprises a member for insertion into the bore and a cap integrally constructed with the member. The cap has a larger diameter than the diameter of the bore and includes a transverse groove that extends completely across the cap to a depth below a lowest point of the cap.

Heavy duty installations normally include an insulation layer protected by an external protective skin. The base of the groove terminates at the periphery of the member and depends beneath a surface of the skin facing the insulation. An elongate spring having oppositely extending arms is disposed in the groove and has ends that extend beneath the skin, engage said skin side and resiliently contact the groove base. The spring thereby biases the plug into its innermost position, as determined by the engagement of the cap with the skin, and retains the plug in position.

The spring is defined by a coil and the arms extending in opposite directions from a common point on the coil. A center portion of the groove includes a semicircular depression aligned with the groove and dimensioned to accommodate the coil so that the arms can rest against the base of the remainder of the groove. The minimum depth of the groove is further substantially greater than the diameter of the spring to assure that the spring is protected in the groove against tampering, accidental dislodgment and the like.

In the preferred embodiment of the invention a relatively short slit is formed in the cap which extends perpendicular to the groove in the vicinity of the semicircular depression. The slit has a width equal to or only slightly greater than the width of the groove to assure that it cannot be manually reached. The only way the spring can be removed from the groove is with a specially designed, narrow tool, such as flat pliers, which can be inserted into the slit for grasping the center portion of the spring and pulling the spring out of the groove.

In an installation having a hole-sawed bore through an aluminum skin and the insulation, the selected plug is placed into the bore until the cap rests against the skin. The plug is selected so that the length of its body member is equal to or just slightly less than the depth of the bore to avoid the formation of air pockets in the bore. Such air pockets reduce the thermal insulation around the pipe and in instances in which high viscosity, high melting point fluids are transported in the pipe the reduced insulation may trigger a solidification of fluid in the vicinity of the bore and thus cause a buildup of solids which restricts the effective pipe diameter.

The cap completely covers the hole and the arms of a spring are now compressed together, the arm ends are inserted in the groove, the spring is permitted to expand partially until the arm ends contact the insulation material and thereafter the spring is released. The free arm ends thereby enter the insulation material beneath the skin and engage the side of the skin facing the pipe. The spring continues to relax towards its straight, elongate position until its arms engage the base of the groove. This engagement generates a force biasing the plug into the bore and retaining it therein. Removal of the plug requires substantial familiarity with it and the above-described removal tool.

Thus, it has been illustrated that the present invention is a significant improvement over the prior art. The plug can be installed irrespective of the bore diameter and if a bore is excessively oversize, due to sloppy hole sawing or other circumstances, it is a simple expedient to select a slightly longer spring. The holding power of the plug of the present invention is much greater than that of the plug disclosed in the above-referenced prior art patent since its holding power is generated by a metal-to-metal contact between the spring and the outer insulation skin, on the one hand, and a direct mechanical contact between the spring at the base of the groove of the plug on the other hand. The prior art plug relies on engagement of the relatively soft insulating material by the handle to generate the holding force.

The plug of the present invention is readily molded from inexpensive raw materials such as granular fire brick material that is dry pressed and, therefore, does not require form-drying. After forming the plug is fired in a kiln and ready for use. No assembly work whatsoever is required. The spring is a lowcost, mass produceable item. Manual assembly is not required. Thus, the plug of the present invention is substantially less costly than the less satisfactory prior art plugs.

BRIEF DESCRIPTION OF THE DRAWINGS

FIG. 1 is a fragmentary cross sectional view through a portion of an insulated pipe having a bore in the insulation closed with a plug in accordance with the present invention;

FIG. 2 is a plan view of the plug illustrated in FIG. 1;

FIG. 3 is an end view of the plug illustrated in FIG. 1; and

FIG. 4 is a cross sectional view taken on line 4—4 of FIG. 2 of the plug.

DESCRIPTION OF THE PREFERRED EMBODIMENTS

Referring to FIG. 1, a pipe 2 or a similar vessel is fragmentarily illustrated and includes around its exterior surface an insulation layer 4 and, on the exterior of the insulation, a protective skin 6 made of aluminum, for example. A hole or bore 8 bottoms on exterior surface 10 of pipe 2 and is drilled, hole-sawed or otherwise formed through the skin and the insulation.

Referring to FIGS. 1–4, the hole is closed and thermally insulated with a plug 12 constructed in accordance with the invention. The plug comprises a body member 14 of a round cross section complementary to the diameter of bore 8 and a cap or cover 16 integrally constructed with the body. The plug is constructed of a thermally insulating, heat-resistant material. For high temperature applications it is constructed of granular fire brick material capable of withstanding temperatures as high as 2,200° F. Such material is readily available on the marketplace and is dry-formed in suitable molds. After molding the plug is fired at the appropriate temperature to form a coherent high-strength plug.

A transverse groove 18 is formed in the cap and extends diametrically across the cap. The groove has a depth so that base 20 of the groove lies beneath an inner side 22 of skin 6 facing pipe 2. A center portion of the groove includes a generally semicircular depression 24. The plug further includes a relatively short, narrow slit 26 positioned perpendicular with respect to and protruding downwardly to intersect the semicircular depression 24.

A spring 28 is defined by a single coil center section 30 and two elongate, substantially straight arms 32 that extend tangentially with respect to a common point of the coil in opposite direction away therefrom when the spring is relaxed. The spring is constructed of piano wire or the like and has a diameter slightly less than the width of groove 18 so that the spring can completely enter the groove. The intersection between periphery 34 of body 14 and groove base 20 is sufficiently deep so that the base is disposed beneath inside 22 of skin 6 when the cap is supported on the skin a distance about equal to or slightly greater than the diameter of the spring. Furthermore, base 20 of the groove has a slightly convexly arcuate shape between depression 24 and body periphery 34.

The actual installation of plug 12 to close and insulate bore 8 in insulation 4 and skin 6 is as follows. A plug is selected which has a body length about equal to the distance between the exterior of skin 6 and pipe 2 so that there is little or no empty space between body member 14 and the pipe. Alternatively the plug can be selected so that plug end face 36 abuts pipe exterior 10 and thus positions the plug. In this position the outer end of groove base 20 is just beneath insulation skin 6 as was described above.

The operator now grasps a relaxed spring 28 (in which arms 32 are in general alignment) and compresses the arms into the relative angular configuration illustrated in phantom lines in FIG. 1. The spring is sufficiently compressed so that its free ends can be placed in groove 18 beneath skin 6 and it is thereafter pushed downwardly and permitted to slightly expand to engage the free spring arm ends with insulation 4.

Spring coil 30 is now generally aligned with semicircular depression 24 of groove 18 and the spring is released whereupon the arms return to their mutual alignment. This draws the coiled center 30 of the spring downwardly until the coil rests in groove depression 24. This also extends spring arms 32 outwardly and upwardly, usually permitting the arms to cut through the relatively soft insulation until in engagement with skin inside 22. At this point the arms conform to the convexly arcuate base 20 of the groove and generate a resulting force which biases the plug towards pipe 2. Thus, the plug is firmly retained in position, completely covers the bore, provides thermal insulation and cannot be removed since spring 28 is safely tucked away in groove 18.

To prevent unauthorized manual removal of the spring it is preferred that the maximum width of both the groove and the slit 26 is no more than ⅜-inch and preferably no more than about ⅛- to 3/16-inch.

To remove the plug, say for ultrasonically testing pipe 2, the intersection of spring arms 32 and coil center 30 is grasped with a tool, preferably a specially designed pair of pliers that are sufficiently narrow so that they can be inserted in slit 26. The spring is pulled upwardly and raised into the position shown in phantom lines in FIG. 1 with the spring arms angularly inclined. Raising the spring further frees spring ends 38 from skin 6, the spring arms can relax, and plug 12 can be lifted from the bore 8.

In actual installation, as is well known in the art, a test bore 8 is provided every few feet, say every six feet over the length of the pipe and each bore is closed and insulated with a removably mounted plug 12 constructed in accordance with the invention. Conventional plugs have diameters between 2½ to 3 inches and a depth that may range to several inches. It is preferred to provide several plugs each having a different length of body member 14 so that a plug can be placed in the bore which has a body member of a length substantially equal to the depth of the bore. This is readily done by providing a selection of plugs, each having a different length of cylindrical portion 40 of plug body 14.

For instances in which the plug is constructed of granular, dry-pressed fire brick material and the like it is preferred to coat upper surface 42 of cap 16 with a water repelling, heat-resistant material such as certain heat-resistant paints. Excessive moisture absorption, swelling and possible disintegration of the plug due to moisture absorption are thereby prevented.

If the plug is installed in a bore through insulation not protected with a protective skin and when the insulation material is relatively soft, the spring is preset, that is arms 32 are permanently bent downwardly to reduce the upward force exerted by the released spring and prevent it from ripping through the insulation. In this manner the plug of the present invention can be safely installed in holes through exteriorly unprotected insulation layers.

I claim:

1. A removable insulating plug for closing a hole in an insulation comprising a member for insertion into the hole, a cap integrally constructed with the member and having a diameter larger than the hole diameter, and a transverse groove extending completely across the cap, and spring means constructed of a resilient material having a length greater than the length of the groove for placement into the groove when the member is disposed in a hole and for engaging the insulation with ends of the spring means to thereby retain the plug in the hole.

2. A plug according to claim 1 including a generally semicircular disc-shaped depression aligned with the groove and extending into a member of the plug, the depression having an axis perpendicular to the groove and to an axis of the plug.

3. A plug according to claim 2 including a transverse slot intersecting the groove, disposed substantially perpendicular to the groove and having a lesser length than the groove.

4. A plug according to claim 3 wherein the groove and the slot have widths of no more than about 0.375 inch.

5. A plug according to claim 3 wherein the spring means is defined by a coil and arms extending in opposite directions from the coil, the spring having a length substantially greater than the length of the groove so that the coil can be positioned in the semicircular depression while free ends of the arms engage the insulation, bias the cap into engagement with the insulation and retain the member in the hole.

6. An insulating plug for re-insulating holes in an insulating layer over a fluid conduit or the like comprising a body having a generally circular cross section complementary to the hole for insertion therein, a cap integrally constructed with the body at one end of the body and having a diameter greater than the hole diameter, an aligned groove at at least two oppositely positioned points of the cap adjacent a periphery of the cap, the groove having a depth greater than a thickness of the cap so that the groove extends partially into the hole, and spring means defined by at least one generally straight resilient member, the spring means having a length greater than the diameter of the hole and a diameter less than a thickness of the groove for placement therein so that ends of the spring means can engage the insulating material while the spring means is resiliently deflected so that said member defines a pair of angularly inclined sections, whereby release of the spring means resiliently straightens the members, biases the spring means into the groove against the plug and thus securely retains the plug in the hole.

7. A plug according to claim 6 wherein the member has a generally round cross section, wherein the groove extends below the cap a distance slightly greater than the diameter of the member.

8. A plug according to claim 7 wherein the layer includes an outer skin, and wherein the groove extends below the cap a distance slightly greater than the sum of the skin thickness and of the spring means diameter.

9. A plug according to claim 6 wherein the groove extends fully across the cap.

10. A plug according to claim 9 wherein the member has a generally round configuration, and wherein the depth of the groove at any given point is greater than the diameter of the member.

11. A plug according to claim 10 wherein the groove has a base terminating at a periphery of the plug, and wherein the base of the groove is oriented so that a portion of the base spaced from the periphery extends above an outer surface of the insulation.

12. A plug according to claim 11 wherein a length of the base between the periphery and said portion is arcuately shaped.

13. A plug according to claim 6 wherein the spring means is defined by a coil and a pair of substantially straight, elongate arms extending generally tangentially away from a common point of the coil, and including a generally semicircular depression at about a center of the groove having a sufficient depth to accommodate said coil so that a base of the groove engages the arms of the spring.

14. A plug according to claim 13 including a narrow slit positioned to intersect the groove and the coil disposed in the depression for grasping the coil with a narrow tool to remove the spring means from the groove and permit removal of the plug from the hole.

15. A plug according to claim 14 wherein the slit has a length less than the diameter of the cap.

16. Apparatus for closing a hole in an insulating layer covered by a skin, the hole extending through the skin, the apparatus comprising a plug dimensioned for insertion into the hole, a transverse slit terminating at a periphery of the plug, means for limiting the extent to which the plug can enter the hole so that in the limiting position the slit extends beneath the skin, and spring means for placement in the slit, extension to beneath the skin and thereby engaging a base of the slit and biasing the plug into its limiting position.

17. An installation comprising a conduit, thermal insulation about the conduit, a skin about the insulation, at least one, generally radially oriented hole extending through the skin and the insulation to the conduit, a plug removably disposed in the hole including means limiting the maximum extent to which the plug can enter the hole, a groove extending fully across the plug and terminating at a periphery of the plug, the groove having a sufficient depth so that a bottom surface thereof is disposed beneath the skin when the plug is fully inserted into the hole, spring means disposed in the groove in resilient contact with a side of the skin facing the insulation and with the bottom surface to thereby bias the plug into its limiting position, whereby the hole is closed and the plug can be removed by first removing the spring means from its engagement with the skin and said bottom surface.

18. An installation according to claim 17 wherein the position limiting means comprises a portion of the plug engaging the conduit.

19. An installation according to claim 18 wherein the position limiting means comprises a portion of the plug disposed exteriorly of the hole and engaging an exterior side of the skin.

20. An installation according to claim 17 wherein the spring means is completely disposed within the groove to prevent unauthorized tampering with or accidental disengagement of the spring means.

21. An installation according to claim 20 including a transverse slit in the plug extending to a sufficient depth to permit the grasping of a center portion of the spring means and removal of the spring means from the groove and from its engagement with the skin by pulling the spring means away from the hole.

* * * * *

O-1050
(5/69)

UNITED STATES PATENT OFFICE
CERTIFICATE OF CORRECTION

Patent No. 3,827,462                    Dated   6 August , 1974

Inventor(s) Jerry J. Celesta, Rodeo, Calif.

It is certified that error appears in the above-identified patent and that said Letters Patent are hereby corrected as shown below:

Inventor:    Jerry J. Celesia, Rodeo, California

Assignee:    Muskateer Corporation, Oakland, California

Signed and sealed this 8th day of October 1974.

(SEAL)
Attest:

McCOY M. GIBSON JR.                        C. MARSHALL DANN
Attesting Officer                            Commissioner of Patents